(12) United States Patent
Ulichney et al.

(10) Patent No.: US 7,830,418 B2
(45) Date of Patent: Nov. 9, 2010

(54) PERCEPTUALLY-DERIVED RED-EYE CORRECTION

(75) Inventors: Robert A. Ulichney, Stow, MA (US); Matthew D. Gaubatz, Neenah, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 872 days.

(21) Appl. No.: 11/414,765

(22) Filed: Apr. 28, 2006

(65) Prior Publication Data

US 2007/0252906 A1 Nov. 1, 2007

(51) Int. Cl.
*H04N 5/235* (2006.01)
*H04N 9/64* (2006.01)
*G06K 9/00* (2006.01)

(52) U.S. Cl. ............ 348/221.1; 348/246; 348/251; 382/167; 382/203

(58) Field of Classification Search ............ 348/246, 348/251, 221.1; 382/167, 203
See application file for complete search history.

(56) References Cited

U.S. PATENT DOCUMENTS

| | | | | |
|---|---|---|---|---|
| 6,631,208 | B1* | 10/2003 | Kinjo et al. | 382/167 |
| 6,728,401 | B1* | 4/2004 | Hardeberg | 382/167 |
| 6,741,753 | B1* | 5/2004 | Moroney | 382/274 |
| 7,127,108 | B2* | 10/2006 | Kinjo et al. | 382/203 |
| 2002/0171852 | A1* | 11/2002 | Zhang et al. | 358/1.9 |
| 2003/0202105 | A1 | 10/2003 | Gaubatz et al. | |
| 2004/0041924 | A1* | 3/2004 | White et al. | 348/239 |
| 2006/0008173 | A1 | 1/2006 | Matsugu | |

FOREIGN PATENT DOCUMENTS

EP 1447974 8/2004

OTHER PUBLICATIONS

Luo et al., "An efficient redeye detection and correction algorithm," Proc. IEEE Conf. on Pattern Recognition, Cambridge, UK, 2004.
Zhang et al., "Automated red-eye detection and correction in digital photographs," Proc. IEEE Conf. on Image Processing, Singapore, 2004, pp. 2363-2366.
M. Gaubatz and R. Ulichney, "Automatic red-eye detection and correction," Proc. IEEE Conf. on Image Processing, Rochester, N.Y. 2002, pp. 804-807.
Schildkraut et al., "A fully automatic red detection and correction algorithm," Proc. IEEE Conf. Image Processing, Rochester, N.Y. 2002, pp. 801-803.
Schettini et al, "A modular procedure for automatic redeye correction in digital photographs," Proc. SPIE Conf. on Color Imaging Processing, Hardcopy, and Applications IX, Sa.
Ulichney et al: "Perceptual-based correction of photo red-eye" Proc of the 7th IASTED Conf. on Signal & Image Proc. Aug. 15, 2005.

* cited by examiner

*Primary Examiner*—Lin Ye
*Assistant Examiner*—Mekonnen Dagnew

(57) ABSTRACT

Red-eye correction on a region of a digital image includes adjusting luminance of the region by generating a statistical measure of the luminance in the region, and computing an adjusted luminance based on the statistical measure according to a viewing condition.

17 Claims, 6 Drawing Sheets

PERCEPTUALLY-DERIVED RED-EYE CORRECTION

BACKGROUND

Red-eye, a condition caused by direct flash photography, results when light from a camera's flash reflects off the retina of a human eye. The light is reflected by red blood cells in the retina. The pupil of the eye appears bright red in a photograph.

Various techniques are available for correcting red-eye in digital images. Most techniques involve manually identifying the affected region of an eye, and desaturating the red pixels in the affected region.

Often, the red-eye correction is not visually pleasing. It would be desirable to correct red-eye in a manner that is visually pleasing.

DETAILED DESCRIPTION

Figure 1:
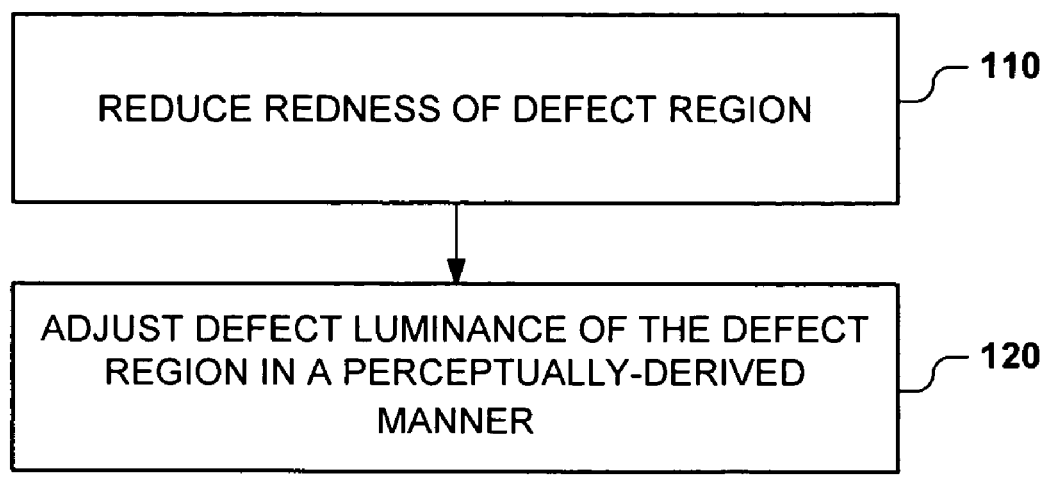
FIG. 1 is an illustration of a red-eye correction method in accordance with an embodiment of the present invention.

Reference is made to FIG. 1, which illustrates a general method of performing red-eye correction on a defect region of a digital image. The general method includes reducing "redness" of the defect region (block 110). The defect region can be fully desaturated, leaving only gray pixels, or it can be partially desaturated, making the eye appear less red. If a red-eye defect washes out the color of the iris, the red in the defect region could even be replaced with a different color. However, reducing the saturation is preferred.

The general method further includes adjusting defect luminance of the defect region in a perceptually-derived manner (block 120). Eyes of subjects in images unaffected by red-eye defects are often darker (blacker) than those containing such defects. The perceptually-derived adjustment reduces the brightness of the pixels contained in the defect in a way that makes the red-eye correction appear more natural and more pleasing.

The luminance of the defect region may be adjusted according to pre-determined data indicating general correction preferences. The data may be generated from perceptual experiments that reveal a user-preferred luminance for a corrected defect region.

The user-preferred luminance might depend upon how the image is displayed. For instance, a user-preferred luminance for a print medium might be different than the user-preferred luminance for a video display. The user-preferred luminance might also depend on viewing distance, the type of paper on which the image is printed, the lighting in the room in which the image is viewed, the type of device that displays the image (LCD v. CRT v. projector), etc.

The defect region can be identified prior to or during red-eye correction. The defect region can be identified manually or automatically. Manual identification can be performed by allowing a user to highlight the defect region. Many commercially-available photo editing programs have this feature. An example of automatic identification is described in U.S. Patent Application No. 2003/0202105. Examples of classifier-based methods that automatically perform initial candidate selection and verification are described in Luo et al., "An efficient redeye detection and correction algorithm," Proc. IEEE Conf. on Pattern Recognition, Cambridge, UK, 2004; and Zhang et al., "Automated red-eye detection and correction in digital photographs," Proc. IEEE Conf. on Image Processing, Singapore, 2004, pp. 2363-66. An example of a method that uses face detection as a starting point and then looks for red-eye is described in M. Gaubatz and R. Ulichney, "Automatic red-eye detection and correction," Proc. IEEE Conf. on Image Processing, Rochester, N.Y. 2002, pp. 804-807. Instead of starting explicitly with the face, red-eye detection can begin with skin, as described in Schildkraut et al., "A fully automatic red detection and correction algorithm," Proc. IEEE Conf. Image Processing, Rochester, N.Y. 2002, pp. 801-803; and Schettini et al., "A modular procedure for automatic redeye correction in digital photographs," Proc. SPIE Conf. on Color Imaging" Processing, Hardcopy, and Applications IX, San Jose, Calif. 2004. Any of these methods for performing red-eye detection could be integrated with a red-eye correction method in accordance with an embodiment of the present invention.

Figure 2:
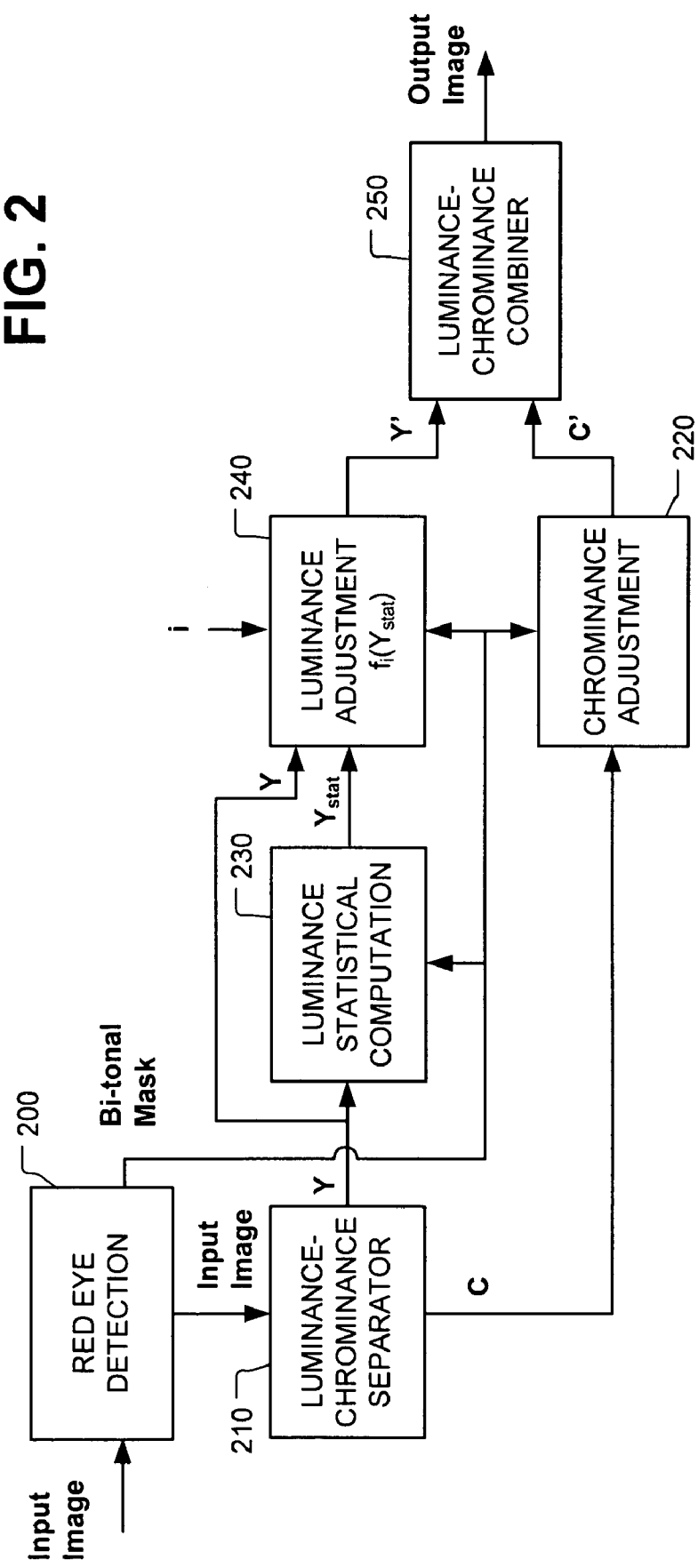
FIG. 2 is an illustration of a red-eye correction method in accordance with an embodiment of the present invention.

Reference is now made to FIG. 2, which illustrates an exemplary method of performing red-eye correction on an input digital image. At block 200, detection processing is performed on the input image. During detection processing, a red-eye defect region in the input image is identified, and a bi-tonal mask is generated. The bi-tonal mask delimits pixels that make up the defect in the defect region. For instance, the bi-tonal mask is the same size as the input image, and identifies the size, shape and location of the defect.

Figure 3:
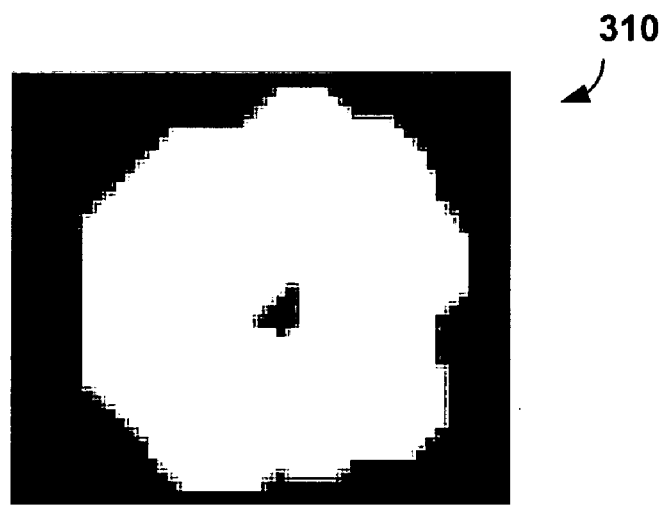
FIG. 3 is an illustration of a portion of an exemplary bi-tonal mask.

Reference is now made to FIG. 3, which illustrates a portion 310 of an exemplary bi-tonal mask. The portion 310 illustrated in FIG. 3 is associated with a red-eye defect region. The portion 310 is white in the region corresponding to the pixels that appear red, and it is black elsewhere.

There might be a glint (that is, a bright white spot on the eye due to the reflection of a flash) in the defect region. Since the glint generally appears white instead of red, the glint can be excluded from defect correction. The black center of the portion 310 corresponds to the glint.

The glint can be detected any number of ways. For example, it can be detected by locating small regions with abrupt changes in luminance (in the first and/or second derivatives).

Reference is once again made to FIG. 2. At block 210, the input image is supplied to a luminance-chrominance separator, which separates the chrominance channel of the input image from the luminance channel of the input image. The luminance channel is labeled Y and the chrominance channel is labeled C.

If the input image is not already in a luminance-chrominance space, it is converted to a luminance chrominance space. For example, the input image may be converted from RGB space to YUV space.

The chrominance channel typically includes two values per pixel and the luminance component typically includes one value per pixel. For example, if the input image is in YUV color space, the luminance channel would include one Y value per pixel, and the chrominance channel would include U and V values per pixel.

At block 220, saturation of defect pixels within the defect region is reduced (the bi-tonal mask identifies the defect pixels). The chrominance values of those pixels within the defect region may be multiplicatively reduced in magnitude. For instance, a mask value of '1' causes full desaturation of those pixels within the defect region, while a mask value of '0' results in no desaturation of the non-defect pixels. Resulting is an adjusted chrominance channel, which is labeled C'.

At blocks 230-240, the luminance channel is adjusted in a perceptually-derived manner. At block 230, a statistical measure ($Y_{stat}$) of luminance is computed from the pixels within the defect region (the bi-tonal mask identifies the defect region). For example, the statistical measure may be average luminance of the defect region. However, the statistical measure is not limited to an average luminance. Another measure that captures a representative value may be used, such as the maximum luminance, or a luminance range.

At block 240, the statistical measure is adjusted according to a mapping function $f_i(\ )$. The mapping function provides a perceptually-driven luminance adjustment to the defect in the defect region (the bi-tonal mask identifies the defect pixels). The adjustment may reflect user preferences that are based on pre-determined data. For example, the mapping function provides a user-preferred average luminance in response to a statistical average. Each defect pixel may be assigned the same preferred luminance value. All other pixels in the input image are not adjusted. Resulting is an adjusted luminance channel, which is labeled Y'.

Different mappings could be provided for different viewing conditions. For example, the mapping that is provided at block 240 might depend upon how the image is displayed, viewing distance, the type of paper on which an image is printed, the lighting in the room in which the image is viewed, the type of device that displays the image, etc. In FIG. 2, the index i to the function f( ) represents the mapping function for a viewing condition. For example, mapping functions $f_1(\ )\ldots f_N(\ )$ might provide different mappings for N different viewing distances with respect to a video monitor.

Mapping function generation is not performed at runtime. An example of generating a mapping function will be provided below.

At block 250, the desaturated chrominance channel C' is recombined with the adjusted luminance channel Y'. The resulting output image is free of red-eye defects. If desired, the corrected defect region may be transformed to a different color space (e.g., RGB, CMYK).

The corrected defect region just described has a uniform luminance. The uniform luminance, however, can have an unnatural look, which draws attention to the fact that red-eye correction was performed. If, for example, a red-eye defect contains light red and dark red hues that delineate the pupil from the iris, this definition will be lost if all defect pixels are replaced with a uniform luminance.

Figure 4:
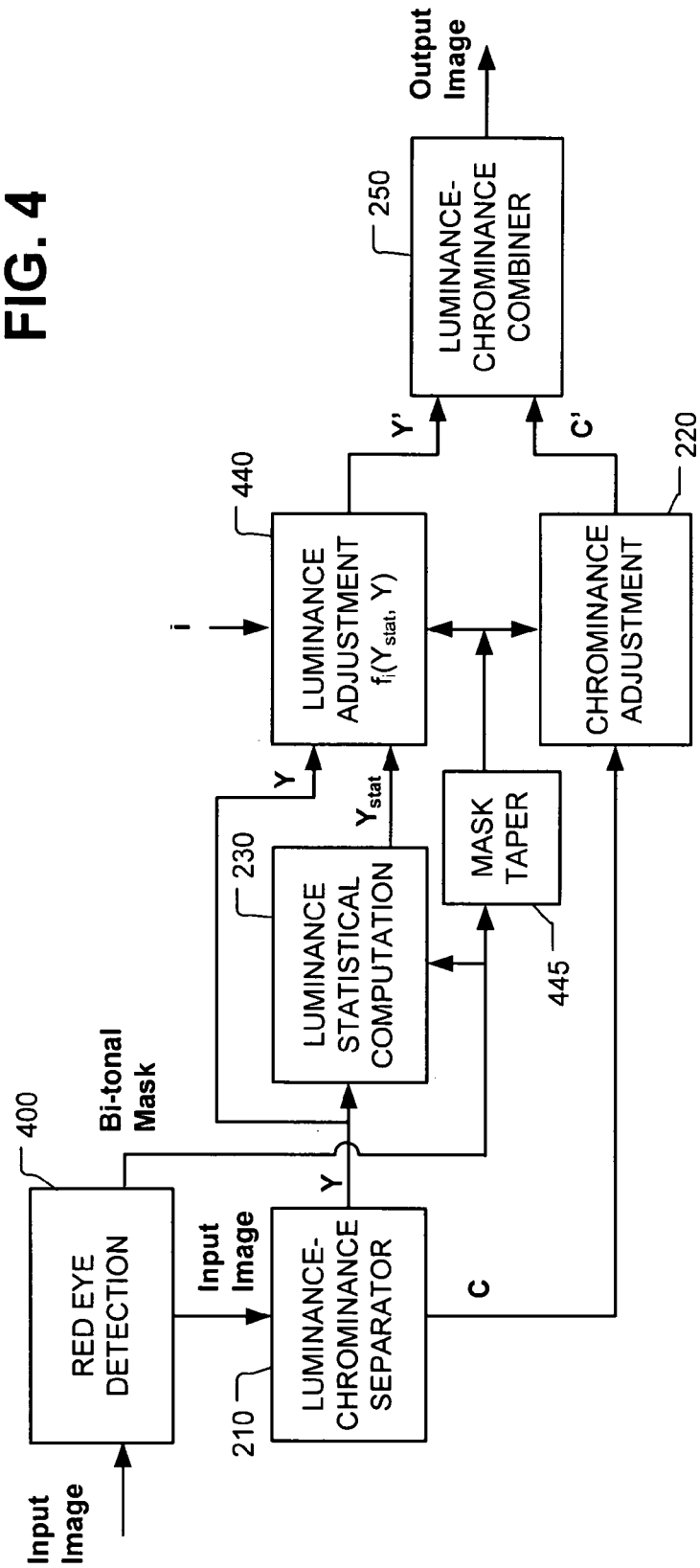
FIG. 4 is an illustration of a red-eye correction method in accordance with an embodiment of the present invention.

Reference is now made to FIG. 4, which illustrates an exemplary method that creates a more natural look in the corrected defect region. As with the method of FIG. 2, an input image is separated into chrominance and luminance channels (block 210), a statistical measure ($Y_{stat}$) of luminance of the defect region is computed (230), and the adjusted luminance and chrominance channels are recombined (block 250).

At block 440, the luminance of defect pixels in the defect region is adjusted as a function of the statistical measure ($Y_{stat}$). The luminance of those defect pixels is also adjusted according to luminance characteristics of the defect region. The following mapping function $f_i(Y_{stat},Y)$ may be used.

Natural luminance variations in the defect region can be preserved by scaling the adjusted luminance values on a per-pixel basis. This adjustment is intended to induce a perceptually derived luminance in the defect region, while preserving the local variations present in the captured eye. As a result, the defect region appears more natural than a defect region having a uniform luminance.

The scaling may be performed on a per-pixel basis as follows. A gain for each pixel may be computed as a function of the luminance of that pixel and the statistical measure of the defect region. For example, if the statistical measure is average luminance ($Y_{av}$), block 440 may compute the adjusted luminance of a defect pixel as ($Y_p'$) as $$Y_p' = \text{Gain} \cdot \text{Mask}_p f_i(Y_{av})$$

where Gain is $Y_p/Y_{av}$ and $Y_p$ is the original luminance of the pixel, and where $\text{Mask}_p$ is the corresponding value of the mask. For a bi-tonal mask, the mask value will be either '1' or '0'.

The scaling is not limited to per-pixel scaling. Pixels could be scaled in groups.

The luminance adjustment is not limited to scaling. The luminance of a defect pixel could be additively reduced by some factor based on the luminance characteristics, or raised to some power based on the luminance characteristics, or even adjusted by a transfer function that varies the adjusted luminance based on the input luminance characteristics. Such a transfer function could be arbitrarily complex, involving non-linear decisions based on thresholds for the input.

To further improve appearance of the corrected defect region, tapering may be performed. Between corrected pixels in the defect region and those unaffected by the red-eye correction, the defect region may be corrected such that the corrected pixels "fade" into the original pixels across space, effectively blurring the boundary between corrected and uncorrected pixels. The tapering can prevent a visible boundary between corrected and uncorrected pixels from appearing. The tapering may be performed in both the luminance and chrominance channels.

To perform the tapering, a grayscale mask may be used instead of a bi-tonal mask. The grayscale mask is tapered such that values between the inside and outside of the mask decrease in a gradient. These values may indicate the percent to which (multiplicative) corrective measures will be applied, i.e. the factor by which luminance will be reduced towards a preferred luminance, or the factor by which chrominance is reduced toward zero. Thus, in the grayscale mask, 0's cause no correction to occur, 1's cause full red-eye correction, and intermediate values cause partial correction.

Figure 5:
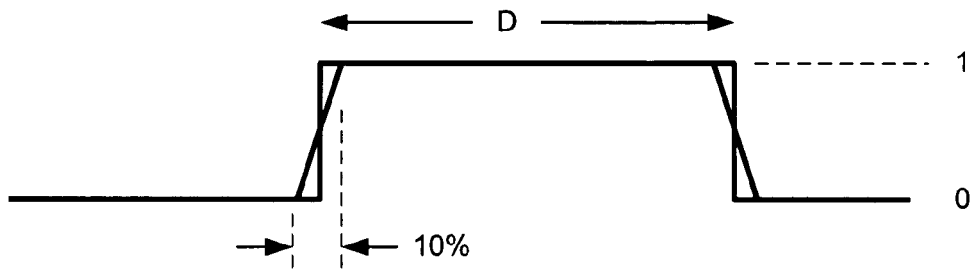
FIG. 5 is an illustration of a profile for a grayscale mask in accordance with an embodiment of the present invention.

Additional reference is made to FIG. 5, which illustrates an exemplary profile for a grayscale mask. A tapered region that is about 10% of the width of the mask has been found to give good results.

The grayscale mask is not limited to a linear taper. The taper could be non-linear. The non-linear taper could be created, for instance, by applying blurring to a bi-tonal (non-tapered) mask. Such a mask softens the boundary between the corrected and uncorrected regions.

The grayscale mask may be generated from a bi-tonal mask, as illustrated by block 445. The same grayscale mask may be applied to both the luminance and chrominance channels. However, different masks (e.g., masks with different tapers) could be applied to different channels.

Another way of performing the tapering includes applying a bi-tonal (non-tapered) mask to the defect region, which can result in a corrected image with an obvious boundary between corrected and uncorrected pixels; and then using selective blurring to "soften" the boundary between the corrected region and the uncorrected region.

Figure 6A:
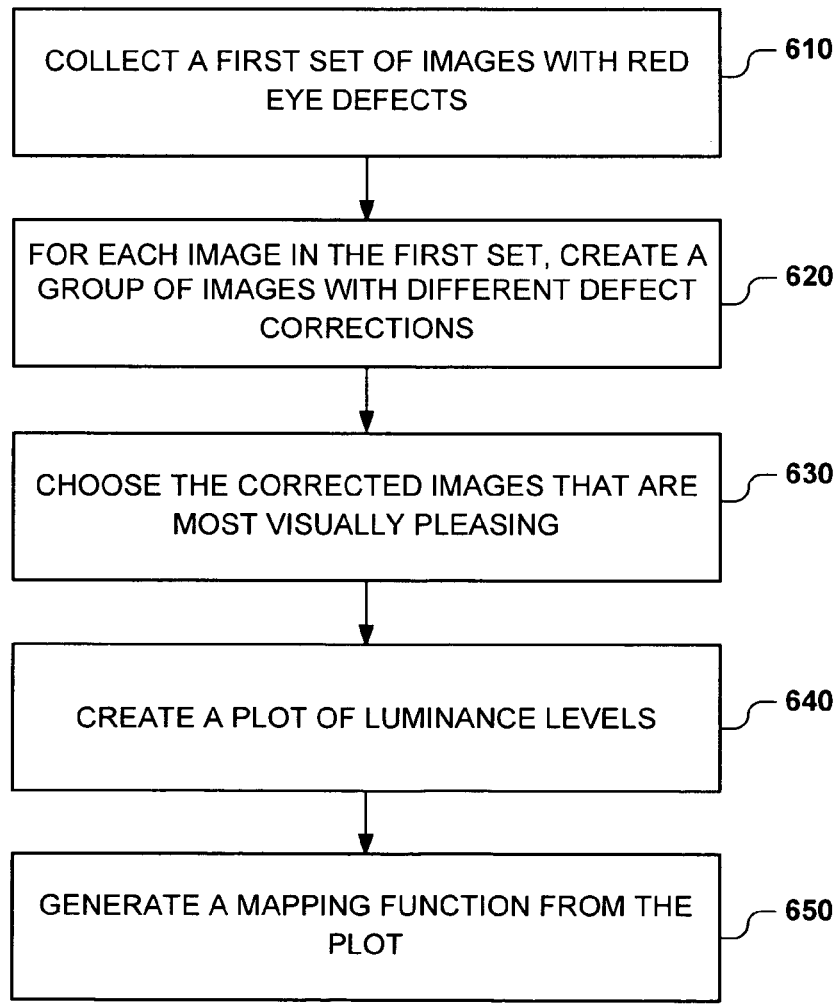
FIG. 6a is an illustration of a method of generating a luminance mapping function in accordance with an embodiment of the present invention.

Reference is now made to FIG. 6a, which illustrates an exemplary method of generating a mapping function that adjusts luminance in a perceptually-derived manner. The method includes collecting a first set of images with red-eye defects (block 610). Different image sets are generated from different viewing conditions (e.g., different image display devices) and are used to generate different mapping functions.

For each image in the first set, a group of images is created with different defect corrections (block 620). The defect corrections in each group use different luminance levels. For example, the mean corrected pixel luminance can be set to five equally spaced levels in CIE L* space. CIE L* space is advantageous because spacing between values in L* corresponds to uniformly perceived differences. In a sense, selecting preferred luminance values in L* simplifies the task of interpreting results of a perceptual experiment.

The user-preferred image in each group is selected (block 630). A random sampling of people could be asked to make the selection. The average defect luminance from the selected images could be used.

As an alternative, the images could be ranked and weighted according to their ranking. The average defect luminance associated with the images that ranked highest could be used.

For each group, an exemplary plot of user-preferred luminance to actual average luminance is generated (block 640).

Figure 6B:
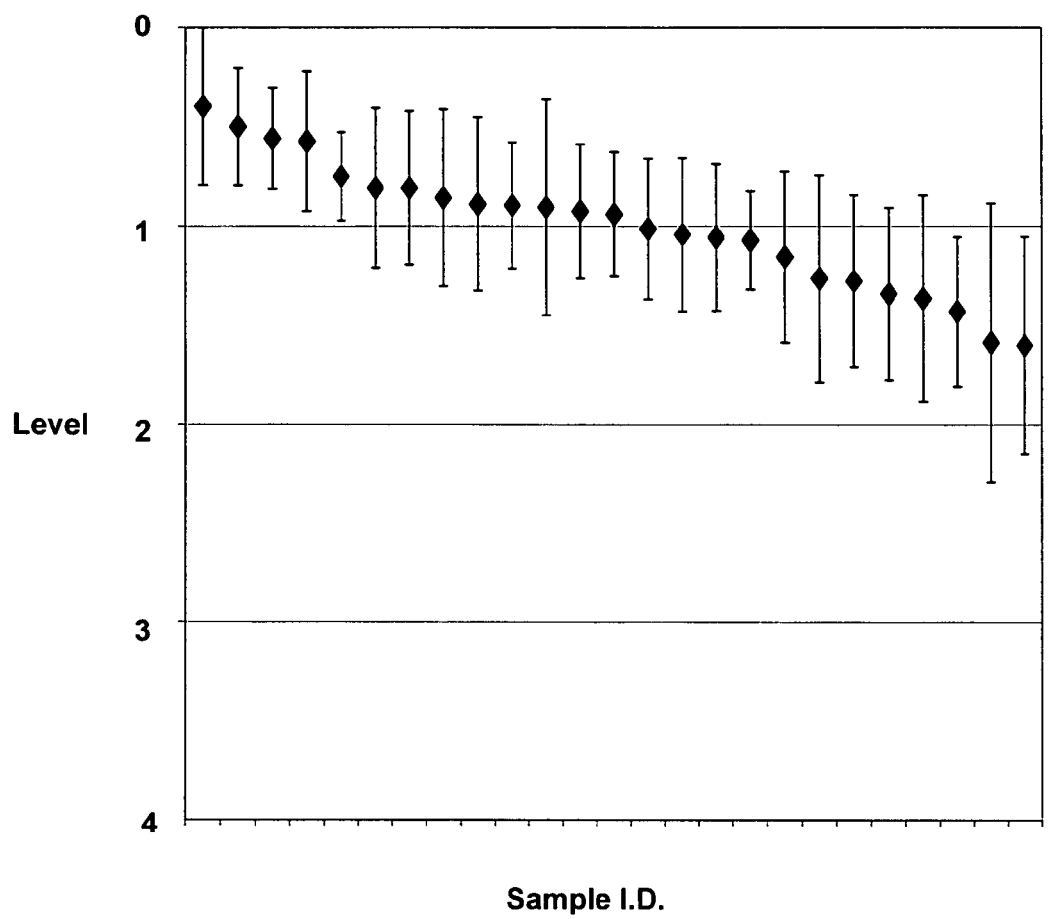
FIG. 6b is an exemplary plot of general user preferences for luminance in a group of images.

Additional reference is made to FIG. 6b, which illustrates an exemplary plot. The Y-axis represents a perceptually uniform index or level of luminance values. The X-axis represents the sample image identifier. The plot is preferably made in a perceptual uniform luminance space (e.g., L*). This choice simplifies the task of distinguishing the luminance levels.

The plot describes the results of a perceptual experiment, where viewers were presented with five corrected versions of a red-eye image, and asked which of the five images looked most natural. Each defect region was corrected such that the average luminance value (in L*) was a constant multiplied by either 0, 1, 2, 3 or 4. These values were referred to as "levels" and are indexed with 0, 1, 2, 3 or 4. The diamonds represent the average user-specified level for each of the 25 images. The bars around each diamond represent the confidence interval of the user responses for that particular image.

Luminance is mapped from the perceptually uniform L* space to digital pixel count Y (block 650). Such mapping is not limited to any particular type.

It has been found that correction may be executed purely based on local image characteristics. Only the luminance of pixels completely inside the region denoted by the mask need to be considered when determining the desired map between the statistical measure of luminance and the user-preferred luminance. With such behavior, algorithm design is simpler and computation is minimal. A best-fit line mapping mean luminance of the correction region to user-preferred luminance may be used.

Figure 7:
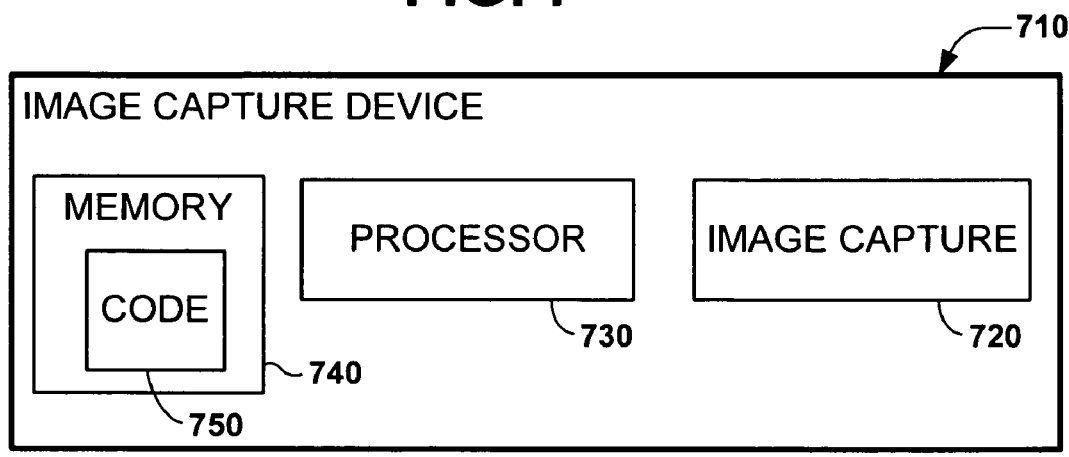
FIGS. 7-8 are illustrations of systems that perform red-eye correction in accordance with embodiments of the present invention.

Reference is made to FIG. 7, which illustrates an image capture device 710 that can perform red-eye correction according to an embodiment of the present invention. The image capture device 710 includes means (e.g., optics, a sensor, readout electronics) 720 for capturing digital images. The image capture device 710 further includes a processor 730 and memory 740 that stores code 750 for causing the processor 730 to perform on-board processing of the captured images. The on-board processing includes the red-eye correction. Examples of image capture devices 710 include, without limitation, digital cameras, all-in-one machines, scanners, camera-equipped cell phones, and personal digital assistants.

Figure 8:
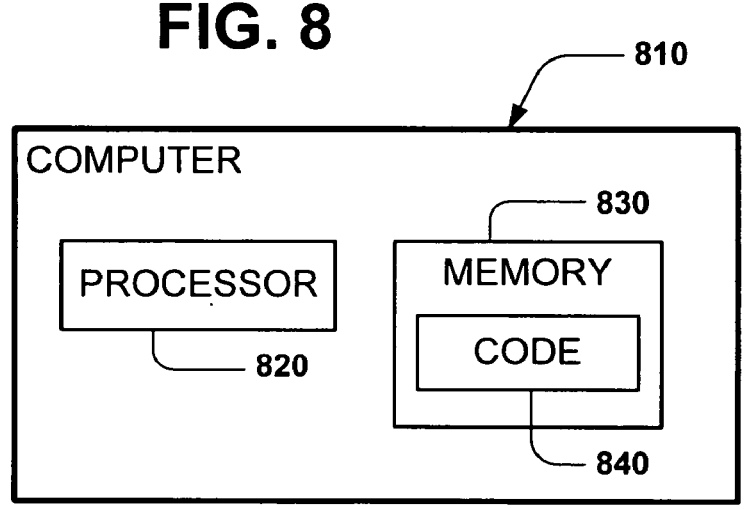

Reference is made to FIG. 8, which illustrates a general-purpose machine 810 that is programmed to perform red-eye correction according to an embodiment of the present invention. The machine 810 includes a processor 820 and memory 830 that stores code 840 for causing the processor 820 to perform the red-eye correction. The code 840 may be a standalone program, or it may be part of a larger program (e.g., a photo editing program, a web-page, an applet, a background service, a plug-in, a batch-processing command). The code 840 may be distributed to the machine 810 via removable memory (e.g., floppy disk, optical disk, flash memory, USB key), via a transmission path (e.g., applet code, a browser plug-in, a downloadable standalone program, a dynamically-linked processing library, a statically-linked library, a shared library, compilable source code), etc. The machine 810 may access a digital image by reading it into memory from a disk, receiving it via a transmission path (e.g., a LAN, the Internet), etc. The machine 810 is not limited to any particular type. Examples of the general purpose machine 810 include personal computers, notebooks and Internet appliances.

Red-eye correction according to the present invention can be performed by other machines and platforms as well. Other machines and platforms include, without limitation, printers and photo-processing kiosks.

Although specific embodiments of the present invention have been described and illustrated, the present invention is not limited to the specific forms or arrangements of parts so described and illustrated. Instead, the present invention is construed according to the following claims.

The invention claimed is:

1. A method of performing red-eye correction on a defect region of a digital image, the method comprising adjusting, by a processor, a luminance of the defect region in which red-eye correction is to be performed,
   wherein adjusting the luminance of the defect region comprises:
      generating a statistical measure of the luminance in the defect region;
      selecting, based on a viewing condition associated with the digital image, one of plural mapping functions corresponding to different viewing conditions, wherein the plural mapping functions apply different luminance adjustments for the different viewing conditions; and
   computing an adjusted luminance by applying the selected mapping function to the statistical measure, wherein the adjusted luminance differs for the different viewing conditions.

2. The method of claim 1, wherein the luminance of the defect region is adjusted according to luminance characteristics of the defect region, whereby the adjusted luminance is non-uniform.

3. The method of claim 1, wherein adjusting the luminance includes scaling the user-preferred statistical measure on a per-pixel basis in the defect region.

4. The method of claim 1, wherein the adjusted luminance in the defect region is tapered from maximum mask correction to no mask correction.

5. The method of claim 1, further comprising reducing redness of the defect region.

6. Apparatus for performing the method of claim 1.

7. An image capture device for performing the method of claim 1 in runtime.

8. An article comprising memory encoded with program code for causing the processor to perform the method of claim 1.

9. A method of correcting a region of a digital image for red-eye, the method comprising:
   computing, by a processor, a statistical measure for the region that is to be corrected for red-eye;
   selecting, by the processor based on a viewing condition associated with the digital image, one of plural mapping functions corresponding to different viewing conditions, wherein the plural mapping functions apply different luminance adjustments for the different viewing conditions; and
   to adjust defect luminance of the region, computing an adjusted luminance by applying the selected mapping function to the statistical measure, wherein the adjusted luminance differs for the different viewing conditions.

10. A method of correcting a defect region of a digital image for red-eye, the method comprising:
    generating, by a processor, a mapping function that provides a user-preferred luminance in response to a statistical luminance measure of the defect region in which red-eye correction is to be performed, the mapping function based on pre-determined data indicating user preferences, wherein the pre-determined data is derived from experimental test data obtained from user selection of preferred corrected images containing different corrections for red-eye,
    wherein different sets of experimental test data are used for different viewing conditions, wherein the obtained experimental test data is one of the different sets of experimental test data.

11. A system for performing red-eye correction on a digital image, the system comprising:
    means for identifying a defect region in which red-eye correction is to be performed; and
    means for reducing redness and adjusting defect luminance of the defect region, wherein adjusting the defect luminance comprises:
       generating a statistical measure of luminance in the defect region;
       selecting, based on a viewing condition associated with the digital image, one of plural mapping functions corresponding to different viewing conditions, wherein the plural mapping functions apply different luminance adjustments for the different viewing conditions; and
       computing an adjusted luminance by applying the selected mapping function to the statistical measure, wherein the adjusted luminance differs for the different viewing conditions.

12. The system of claim 11, wherein the different viewing conditions comprise one or more of: different viewing distances of the digital image, different types of paper on which the digital image is to be printed, different lighting in which the digital image is viewed, and different types of a device that displays the digital image.

13. Apparatus for correcting a defect region of a digital image for red-eye, the apparatus comprising a processor configured to reduce redness of the defect region and to adjust defect luminance of the region, wherein the defect luminance is adjusted by:
    generating a statistical measure of luminance in the defect region;
    selecting, based on a viewing condition associated with the digital image, one of plural mapping functions corresponding to different viewing conditions, wherein the plural mapping functions apply different luminance adjustments for the different viewing conditions; and
    computing an adjusted luminance by applying the selected mapping function to the statistical measure, wherein the adjusted luminance differs for the different viewing conditions.

14. The apparatus of claim 13, wherein the defect luminance is adjusted by further scaling the user-preferred statistical measure on a per-pixel basis in the defect region.

15. The apparatus of claim 13, wherein the different viewing conditions comprise one or more of: different viewing distances of the digital image, different types of paper on which the digital image is to be printed, different lighting in which the digital image is viewed, and different types of a device that displays the digital image.

16. A method of performing red-eye correction on a defect region of a digital image, the method comprising adjusting, by a processor, a luminance of the defect region in which red-eye correction is to be performed,
    wherein adjusting the luminance of the defect region comprises:
       generating a statistical measure of the luminance in the defect region; and
       computing an adjusted luminance based on the statistical measure according to a viewing condition associated with the digital image, wherein the adjusted luminance differs for different viewing conditions,
    wherein the different viewing conditions comprise one or more of: different viewing distances of the digital image, different types of paper on which the digital image is to be printed, different lighting in which the digital image is viewed, and different types of a device that displays the digital image.

17. A method of correcting a region of a digital image for red-eye, the method comprising:
    computing, by a processor, a statistical measure for the region that is to be corrected for red-eye;
    determining, by the processor, a user-preferred measure in lieu of the statistical measure according to a viewing condition, wherein different user-preferred measures are generated for different viewing conditions; and
    adjusting, by the processor, defect luminance of the region based on the determined user-preferred measure,
    wherein the different viewing conditions comprise one or more of: different viewing distances of the digital image, different types of paper on which the digital image is to be printed, different lighting in which the digital image is viewed, and different types of a device that displays the digital image.

* * * * *